June 5, 1956   J. A. DINWIDDIE ET AL   2,749,216
PRODUCTION OF GAMMA ALUMINA
Filed Nov. 1, 1952
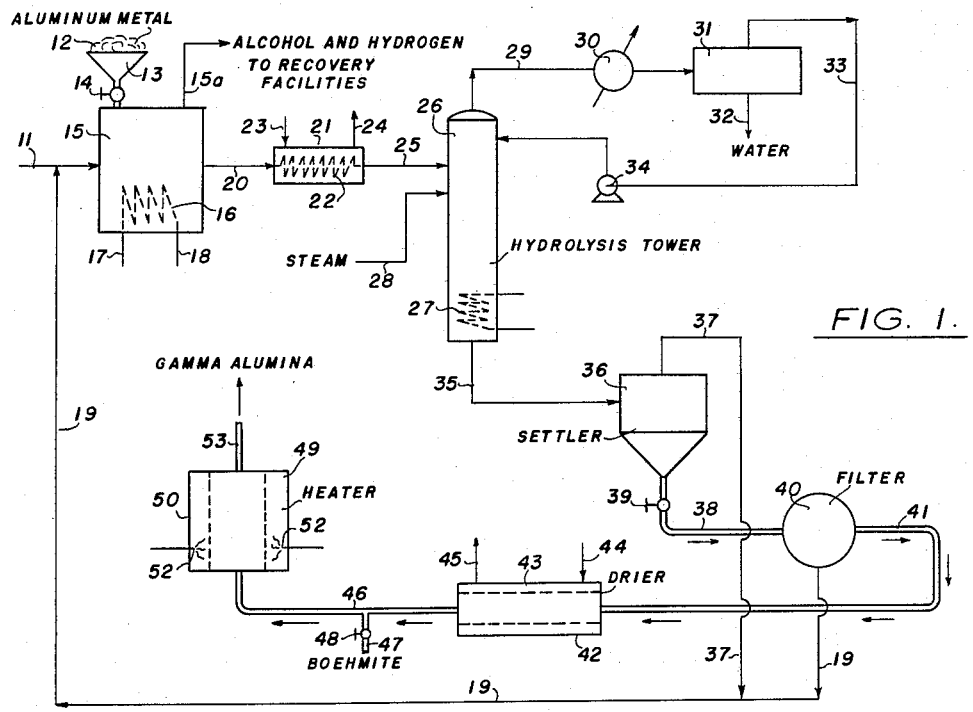
FIG. 1.
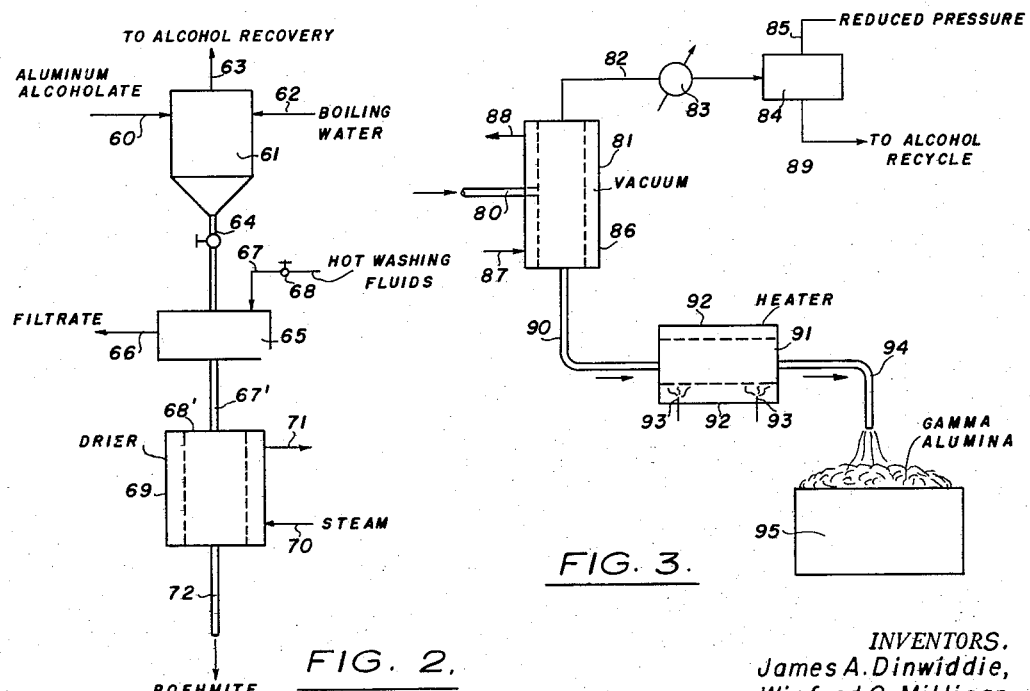
FIG. 2.
FIG. 3.
INVENTORS.
James A. Dinwiddie,
Winfred O. Milligan,
Max A. Mosesman,
BY
AGENT.

United States Patent Office 2,749,216
Patented June 5, 1956

2,749,216

PRODUCTION OF GAMMA ALUMINA

James A. Dinwiddie, Baytown, Winfred O. Milligan, Houston, and Max A. Mosesman, Baytown, Tex., assignors, by mesne assignments, to Esso Research and Engineering Company, Elizabeth, N. J., a corporation of Delaware Application November 1, 1952, Serial No. 318,212

8 Claims. (Cl. 23—143)

The present invention is directed to a method for producing gamma alumina. More particularly, the invention is directed to a method for producing the hydrate of gamma alumina which is sometimes called boehmite and has been designated as alpha alumina monohydrate in the Alcoa classification of the Aluminum Company of America and as gamma alumina monohydrate by Weiser and Milligan in 1934. These classifications are set out in Table I of Technical Paper No. 10, "Alumina Properties," Allen S. Russell, Aluminum Company of America, Pittsburgh, Pennsylvania, 1953. It is preferred to designate this hydrate as gamma alumina monohydrate in the Weiser and Milligan classification although either designation may be used. In its more specific aspects, the invention is directed to producing gamma alumina having a high surface area and thermal stability.

The present invention may be briefly described as involving the hydrolysis of aluminum alcoholate by contacting the aluminum alcoholate with water at a temperature at least above the boiling point of water to hydrolyze the alcoholate to gamma alumina monohydrate and rapidly removing excess water from the gamma alumina monohydrate formed during the hydrolysis. The invention contemplates the drying of the gamma alumina monohydrate and heating of the dried gamma alumina monohydrate to remove combined water and to form gamma alumina.

It is contemplated that the present invention will include the formation of the aluminum alcoholate by reacting aluminum metal with an aliphatic alcohol having from 1 to 10 carbon atoms in the molecule to cause the formation of the aluminum alcoholate. For example, aluminum turnings may be reacted with the aliphatic alcohol at temperatures in the range from about 75° to about 300° F. to form the aluminum alcoholate. The aluminum alcoholate so formed by reaction of aluminum metal with the aliphatic alcohol may comprise a solid aluminum alcoholate phase and a solution of aluminum alcoholate in alcohol. Either the solid phase or the solution or both may be subjected to hydrolysis by contacting same with water at a temperature above the boiling point of the water.

It is contemplated in the present invention that the gamma alumina monohydrate formed in an intermediate step may be the final product and it is further contemplated that the gamma alumina monohydrate may be separated from the residual alcohol and dried at a temperature of about 230° F. and thereafter the dried boehmite may be subjected to a heating operation at a temperature in the range from about 600° to about 1600° F. with temperatures in the range from about 600° to 1000° F. preferred to remove combined water and to form gamma alumina. The heating operation at about 1000° F. insures conversion of the boehmite to gamma-alumina.

The alcohols finding use in the present invention may include the aliphatic alcohols, such as methyl alcohol, ethyl alcohol, the propyl alcohols, the butyl alcohols, amyl alcohols, hexyl and heptyl alcohols, octyl alcohols and the higher members of the series having up to about 10 carbon atoms in the molecule. It is preferred to use amyl alcohol and alcohols having from 5 to 8 carbon atoms in the molecule.

The hydrolysis operation of the present invention may be conducted with water either in the liquid phase or in the vapor phase. Water at its boiling point may be used or steam may be employed in the hydrolysis operation. It is necessary that the water be at or above its boiling point, and temperatures of about 212° to about 300° F. at atmospheric pressure give good results in the hydrolysis operation to form gamma alumina monohydrate from aluminum alcoholate.

It is contemplated that the present invention may also be conducted under reduced pressure or at elevations substantially above sea level such that temperatures below 212° F. may be employed during hydrolysis. In short, if the hydrolysis is conducted at reduced pressures water will boil below 212° F. and our invention contemplates such operations. Likewise superatmospheric pressures may also be used and the temperature of the water will depend on the pressure employed. Ordinarily, however, atmospheric pressure will prevail and temperatures above 212° F. in the range given will be used.

While liquid water at or above its boiling point may satisfactorily used in the practice of our invention, we prefer to use steam and to maintain the system including the aluminum alcoholate at a temperature above 212° F. such that excess water vapor may be rapidly removed from the hydrolysis reaction during the hydrolysis of the aluminum alcoholate to the gamma alumina monohydrate.

It is contemplated that excess water will not contact the aluminum alcoholate or gamma alumina monohydrate as the latter is formed for any appreciable length of time and that water will be rapidly removed. Specifically it is contemplated that the water as such will not remain in contact with the aluminum alcoholate and/or gamma alumina monohydrate for a time much in excess of 30 to 45 minutes. It is preferred that the water be in contact with the aluminum alcoholate and/or gamma alumina monohydrate for a time in the range from about 15 to 30 minutes. Good results have been obtained employing hot water at its boiling point and steam at a temperature in the range given between 15 and 30 minutes.

The invention will be further illustrated by reference to the drawing in which

Fig. 1 is a flow diagram of a preferred mode;

Fig. 2 illustrates a mode of our invention using boiling water; and

Fig. 3 is a modification applicable either to Fig. 1 or Fig. 2 showing the employment of a vacuum drier.

Referring now to the drawing and particularly to Fig. 1, numeral 11 designates a charge line by way of which an aliphatic alcohol, such as amyl alcohol or one of the type mentioned, is introduced into the system. The alcohol may be used alone or in admixture with a solvent such as an aliphatic hydrocarbon, specifically a paraffinic hydrocarbon or a petroleum naphtha. Aluminum metal such as aluminum turnings 12 are provided in a hopper 13 controlled by valve 14 by way of which aluminum metal is introduced into a reactor 15 which is provided with a cooling coil 16 through which a cooling medium is circulated by way of inlet 17 and outlet 18. The aliphatic alcohol is introduced into reactor 15 by line 11 in admixture with recycled alcohol and introduced into line 11 by line 19 as will be described further hereinafter. A catalyst such as a salt of mercury or mercury itself may be added with the alcohol or aluminum to speed up the reaction.

The temperature in the reactor 15 is maintained by circulation of cooling fluid through a cooling coil 16 and a temperature in the range between 75° and 300° F. is provided therein. After the reaction is substantially complete the aluminum alcoholate is withdrawn from reactor 15 by line 20 and passed through a heat exchange means 21 provided with a coil 22 wherein the temperature of the aluminum alcoholate may be adjusted by circulation of a cooling or heating means as the case may be through the heat exchanger 21 by lines 23 and 24. Reactor 15 is provided with line 15a for removal of alcohol and hydrogen. Line 15a may suitably connect to hydrogen and alcohol recovery systems, not shown.

The aluminum alcoholate is then introduced by line 25 at a temperature of about 230° to about 240° F. into a hydrolysis tower 26 which is provided with a heating means illustrated by a steam coil 27. In hydrolysis tower 26 the aluminum alcoholate is contacted with steam introduced by line 28 which causes hydrolysis of the aluminum alcoholate to gamma alumina monohydrate. By virtue of steam coil 27 maintaining the temperature in hydrolysis tower 26 in the range between 230° and 240° F. excess water is continually removed from the hydrolysis tower 26 by line 29, passed through condenser or cooling means 30 and then discharged into a settler 31 wherein a separation is made between water and the alcohol distilled over therewith. The water is discarded from the system by line 32 while the alcohol separated from the water in settler 31 is recycled by line 33 containing a pump 34 to provide reflux in tower 26.

The gamma alumina monohydrate formed by hydrolysis of the aluminum alcoholate in tower 26 is withdrawn therefrom by line 35 and discharged by line 35 into a settler 36 which may be a funnel-shaped vessel. The residence time in settler 36 is only sufficiently long to allow the gamma alumina monohydrate to separate to a large degree from the alcohol remaining associated therewith. The alcohol is withdrawn from settler 36 by line 37 which ties into line 19 for recycling to line 11 as has been described.

The gamma alumina monohydrate as a suspension or slurry discharges from settler 36 by line 38 controlled by valve 39 into a separation means such as is illustrated by a rotary drum filter 40. Rotary drum filter 40 serves to remove remaining alcohol associated with the gamma alumina monohydrate and this alcohol is recycled to line 11 by line 19.

It is contemplated that the gamma alumina monohydrate in filter 40 may be washed by suitable wash liquids, such as acetone, if desired, and this wash liquid withdrawn separately from the separated alcohol. It is also contemplated that the gamma alumina monohydrate may be removed from filter 40 by a suitable scraper or knife and discharged therefrom by line 41 into a drier 42 provided with a jacket 43 through which a heating means is circulated by inlet line 44 and outlet line 45. Drier 43 serves to remove part of the uncombined water from the gamma alumina monohydrate by heating same to a temperature in the range from about 212° to 300° F.; a temperature of about 230° F. is satisfactory.

After the gamma alumina monohydrate has been suitably dried, as described, it may be withdrawn from the system as such through line 46 and branch 47 controlled by valve 48 but preferably the gamma alumina monohydrate is discharged into a heater 49 provided with heating sections 50, each of which is provided with gas burners or heating means 52 by way of which the temperature of the boehmite is raised to a temperature in the range between about 600° and about 1600° F. to cause dehydration of the gamma alumina monohydrate and to form gamma alumina by removal of combined water. The time for heating in heater 49 may suitably be in the range from 3 to 48 hours. After the heat treatment the gamma alumina may be discharged from the system by line 53 and suitably used as a catalyst base, as a catalyst per se or as an adsorption medium.

When the gamma alumina of the present invention is used as a catalyst base or in conjunction with other active catalytic material, the other catalytic material may suitably be added during the processing operation say, for example, it may be added to the system before or after the formation of the aluminum alcoholate or after the formation of the gamma alumina monohydrate. For example, catalytic materials such as silica, iron, cobalt, nickel, platinum, vanadium, chromium, molybdenum, tungsten and many other catalytic materials too numerous to mention here may suitably be added to the gamma alumina either as such or during the formation of the gamma alumina or the formation of the gamma alumina monohydrate. The active metal catalytic component may suitably be in the range from 0.2% to 20% by weight of the composition with the remainder being the gamma alumina. Good results are obtained when the active metal comprises about 9% of the composition.

Referring now to Fig. 2 a mode of practicing our invention is illustrated wherein boiling water and a temperature of the alcoholate solution above the boiling point of water is used to hydrolyze the aluminum alcoholate.

Assuming that aluminum alcoholate is introduced by way of line 60 from a reactor and heat exchanger, such as reactor 15 and heat exchanger 21 in Fig. 1, the aluminum alcoholate at about 230° F. to 240° F. is discharged into hydrolyzer vessel 61 into which is introduced by line 62 boiling water which causes hydrolysis of the aluminum alcoholate to gamma alumina monohydrate and alcohol. The steam and some alcohol are removed from hydrolyzer 61 by line 63 and the alcohol may then be recovered in suitable recovery operations not forming a part of this invention.

After the boiling water has contacted the aluminum alcoholate, the hydrolyzed aluminum alcoholate which is gamma alumina monohydrate is withdrawn from hydrolyzer 61 by opening valve 64 and allowing the contents of hydrolyzer 61 to discharge into a filter 65 which may be suitably a leaf or drum filter. The filtrate is removed from filter 65 by line 66 and may be reused in the process since it will consist substantially of the alcohol. After the alcohol has been removed from the precipitate from filter 65 the precipitate may or may not be washed with hot water and with hot acetone introduced by line 67 controlled by valve 68, the filtrate being discharged by line 66 but separate from the alcohol filtrate.

The precipitate from filter 65 may then be removed by a suitable scraper or knife and the precipitate discharged by line 67' into a drier 68' which is provided with a jacket 69 through which steam circulates by inlet 70 and outlet 71.

In drier 68 a temperature in the range from 200° to 300° F. is maintained. This boehmite may be withdrawn by line 72 and may be used as such or may be suitably heated as in a heater like 49 described with respect to Fig. 1.

Referring now to Fig. 3 a further modification of our invention is illustrated in which a vacuum drier is substituted for the filters in Figs. 1 and 2. In Fig. 3 gamma alumina monohydrate such as from either hydrolyzer 61 in Fig. 2 or hydrolysis tower 26 or settler 36 in Fig. 1 may be introduced by way of line 80 into a vacuum drier 81. Vacuum drier 81 is provided with line 82, a condensing means 83, and a vessel 84. The vessel 84 is connected by line 85 to a source of reduced pressure such as a vacuum pump which causes the rapid removal of alcohol and water from the gamma alumina monohydrate in drier 81.

The drier 81 is provided with a jacket 86 through which is circulated by inlet means 87 and outlet means 88 a suitable heating fluid such as superheated steam which raises the temperature in drier 81 to a temperature in the range from 212° to 600° F. to cause the rapid drying of the boehmite in drier 81, the alcohol removed being condensed in condenser 83 and accumulated in vessel 84 for recycling to the process by way of line 89.

The gamma alumina monohydrate substantially free of uncombined water is withdrawn from drier 81 by line 90 into a heater 91 provided with heating sections 92. Heating sections 92 are provided with burners or heating means 93 which serve to raise the temperature of the gamma alumina monohydrate in heater 91 to a temperature in the range between 600° and 1600° F. to remove combined water and to form gamma alumina. The gamma alumina may be withdrawn from heater 91 by outlet spout 94 and discharged into a suitable bin 95 where it is accumulated for use as a catalyst or the like as has been described.

The invention will be further illustrated by the following examples:

Example I 100 ml. of an aluminum alcoholate solution (prepared by reacting 50 gm. Al turnings, 2000 ml. of a 3/1 $n$-$C_5H_{11}OH$/$n$-$C_7H_{16}$ mixture, and 3 gm. $HgCl_2$) at 235° F. were transferred rapidly from the reaction vessel in which the alcoholate was prepared to a beaker; 100 ml. of boiling water was then added; the precipitate which formed immediately on contact of the water was filtered through a preheated (350° F.) Buchner funnel, washed once with hot water and washed twice with C. P. acetone. The precipitate was then dried at 230° F. for 21 hours. X-ray examination of the dried product indicated it to be gamma alumina monohydrate. It is to be emphasized that speed in mixing, filtering and washing is of paramount importance; these operations in the above example were carried out in an elapsed time of 15 minutes. It should be further noted that the alcoholate solution temperature of 235° F. is sufficient to insure the volatilization of all excess water; and this is a prime feature of our invention.

Example II 200 ml. of the alcoholate solution described in the prior example were rapidly transferred at 235° F. to a flask fitted with a reflux condenser which, in turn, was fitted with a drying tube as a protection from atmospheric moisture. The solution was then brought to refluxing temperature (238°–240° F.) and atmospheric pressure steam was then introduced into the refluxing mixture for approximately 30 minutes. At the end of this period, refluxing was continued for 1 hour; the precipitate was then filtered hot, washed with C. P. acetone, and then dried at 230° F. for 21 hours. X-ray examination of the dried product indicated it to be gamma alumina monohydrate. It should be noted that here again the elevated temperature of the refluxing alcoholate solution during and subsequent to hydrolysis insures that the concentration of water is reduced to a minimum at any time.

Although not expressly mentioned in the above examples, it will be apparent that a stabilizing agent, such as ethyl-orthosilicate, may be incorporated into the improved gamma alumina with boiling water or steam hydrolysis. It is also apparent that other catalytic materials may similarly be incorporated with the aluminum alcoholate, gamma alumina monohydrate, or the gamma alumina during the processing operation.

The nature and objects of the present invention having been completely described and illustrated, what we wish to claim as new and useful and to secure by Letters Patent is:

1. A method for producing gamma alumina monohydrate which comprises reacting aluminum metal with an aliphatic alcohol having from 5 to 8 carbon atoms in the molecule under conditions to form aluminum alcoholate, hydrolyzing said aluminum alcoholate by contacting same with water at a temperature from about the boiling point of water to about 300° F. in a hydrolysis-distillation zone to hydrolyze said alcoholate to gamma alumina monohydrate and to release alcohol, rapidly removing from said hydrolysis-distillation zone excess water and said alcohol such that the water is in contact with said alcoholate undergoing hydrolysis and the gamma monohydrate thus formed for a time not in excess of 45 minutes, separating water from the removed alcohol in a separation zone exteriorly of said hydrolysis-distillation zone, and recycling said separated alcohol to said hydrolysis-distillation zone.

2. A method in accordance with claim 1 in which the water is in the liquid phase.

3. A method in accordance with claim 1 in which the water is in the vapor phase.

4. A method for producing gamma alumina which comprises reacting aluminum metal with an aliphatic alcohol having from 5 to 8 carbon atoms in the molecule under conditions to form aluminum alcoholate, hydrolyzing said aluminum alcoholate by contacting same with water at a temperature from about the boiling point of water to about 300° F. in a hydrolysis-distillation zone to hydrolyze said alcoholate to gamma alumina monohydrate and to release alcohol, rapidly removing from said hydrolysis-distillation zone excess water and said alcohol such that the water is in contact with said alcoholate undergoing hydrolysis and the gamma alumina monohydrate thus formed for a time not in excess of 45 minutes, separating water from the removed alcohol in a separation zone exteriorly of said hydrolysis-distillation zone, recycling said separated alcohol to said hydrolysis-distillation zone, removing from said hydrolysis-distillation zone said gamma alumina monohydrate as a slurry in alcohol, recovering said gamma alumina monohydrate from said slurry and dehydrating said recovered gamma alumina monohydrate to form gamma alumina by heating said recovered gamma alumina monohydrate to a temperature in the range from 600° to 1600° F.

5. A method in accordance with claim 4 in which the water is in the liquid phase.

6. A method in accordance with claim 4 in which the water is in the vapor phase.

7. A method in accordance with claim 4 in which the alcohol removed from the gamma alumina monohydrate is reacted with additional quantities of aluminum metal to form additional amounts of said aluminum alcoholate.

8. A method in accordance with claim 4 in which the aliphatic alcohol is amyl alcohol.

References Cited in the file of this patent

UNITED STATES PATENTS

| | | |
|---|---|---|
| 2,579,251 | Coates et al. | Dec. 18, 1951 |
| 2,636,865 | Kimberlin | Apr. 28, 1953 |
| 2,666,076 | Rex et al. | Jan. 12, 1954 |

FOREIGN PATENTS

| | | |
|---|---|---|
| 667,145 | Great Britain | Feb. 27, 1952 |

OTHER REFERENCES

"Hackh's Chemical Dictionary," by J. Grant, third ed., pages 40 and 136. The Blakiston Co., Philadelphia.